(12) United States Patent
Zhao et al.

(10) Patent No.: US 12,491,862 B2
(45) Date of Patent: Dec. 9, 2025

(54) VEHICLE DRIVING INTELLIGENT ASSISTANCE SYSTEM

(71) Applicants: Shanghai Polytechnic University, Shanghai (CN); Changzhou Institute of Technology, Changzhou (CN)

(72) Inventors: Jingbo Zhao, Changzhou (CN); Lianying Liao, Changzhou (CN); Haimei Liu, Changzhou (CN); Haodong Meng, Changzhou (CN); Yongming Xu, Changzhou (CN); Jianfeng Chen, Changzhou (CN)

(73) Assignees: Shanghai Polytechnic University, Shanghai (CN); Changzhou Institute of Technology, Changzhou (CN)

( * ) Notice: Subject to any disclaimer, the term of this patent is extended or adjusted under 35 U.S.C. 154(b) by 79 days.

(21) Appl. No.: 18/581,016

(22) Filed: Feb. 19, 2024

(65) Prior Publication Data
US 2024/0278770 A1   Aug. 22, 2024

(30) Foreign Application Priority Data
Feb. 20, 2023   (CN) .......................... 202310136253.0

(51) Int. Cl.
*B60W 30/02*   (2012.01)
*B60W 30/12*   (2020.01)
(Continued)

(52) U.S. Cl.
CPC ............ *B60W 30/02* (2013.01); *B60W 30/12* (2013.01); *B60W 30/143* (2013.01);
(Continued)

(58) Field of Classification Search
CPC .... B60W 30/02; B60W 30/12; B60W 30/143; B60W 30/182; B60W 50/12;
(Continued)

(56) References Cited

U.S. PATENT DOCUMENTS

| | | | |
|---|---|---|---|
| 2016/0096431 A1* | 4/2016 | Drews ................. | B60K 26/021 701/96 |
| 2016/0167653 A1* | 6/2016 | Malone ................. | B60W 10/18 701/23 |

(Continued)

*Primary Examiner* — George C Jin
(74) *Attorney, Agent, or Firm* — Jacob M. Ward; Ward Law Office LLC

(57) ABSTRACT

The present disclosure relates to the technical field of intelligent driving, in particular to a vehicle driving intelligent assistance system, which includes an electronic control unit and a Controller Area Network (CAN) module, wherein the CAN module is connected with a driving detection module, a vehicle body state detection module, an engine detection module and an environment detection module, wherein the vehicle body state detection module is configured to acquire a steering angle of a steering wheel and a suspension condition, the environment detection module is configured to acquire environmental information around the vehicle and road conditions; the electronic control unit is connected with a vehicle body stabilization system, a vehicle control system and a lane departure early warning module, and the vehicle control system is configured to control acceleration, steering or braking of a vehicle to achieve assisted driving.

7 Claims, 1 Drawing Sheet

(51) Int. Cl.
*B60W 30/14* (2006.01)
*B60W 30/182* (2020.01)
*B60W 50/12* (2012.01)
*H04L 12/40* (2006.01)

(52) U.S. Cl.
CPC .......... *B60W 30/182* (2013.01); *B60W 50/12* (2013.01); *H04L 12/40* (2013.01); *B60W 2420/403* (2013.01); *B60W 2420/408* (2024.01); *B60W 2510/0666* (2013.01); *B60W 2510/202* (2013.01); *B60W 2510/22* (2013.01); *B60W 2520/10* (2013.01); *B60W 2520/14* (2013.01); *B60W 2520/26* (2013.01); *B60W 2540/18* (2013.01); *B60W 2552/35* (2020.02); *B60W 2555/20* (2020.02); *B60W 2556/40* (2020.02); *B60W 2556/65* (2020.02); *H04L 2012/40215* (2013.01); *H04L 2012/40273* (2013.01)

(58) Field of Classification Search
CPC ..... B60W 2420/403; B60W 2420/408; B60W 2510/0666; B60W 2510/202; B60W 2510/22

See application file for complete search history.

(56) References Cited

U.S. PATENT DOCUMENTS

| | | | |
|---|---|---|---|
| 2021/0031765 A1* | 2/2021 | Poulin | B60W 10/18 |
| 2021/0031782 A1* | 2/2021 | Poulin | B60W 40/09 |
| 2021/0403046 A1* | 12/2021 | Hermalyn | B60W 50/04 |
| 2023/0286451 A1* | 9/2023 | Bauer | B60R 16/0231 |

* cited by examiner

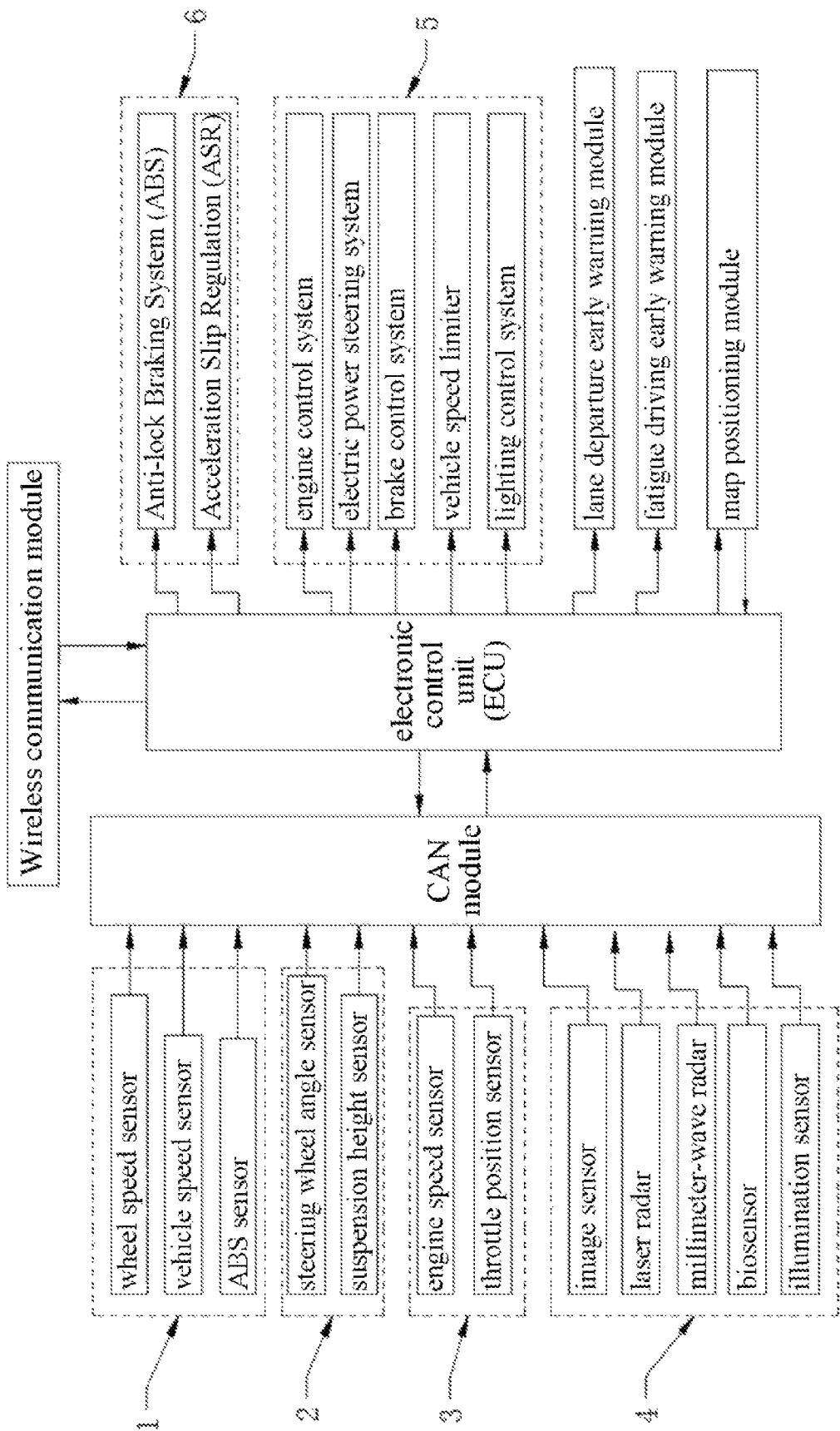

VEHICLE DRIVING INTELLIGENT ASSISTANCE SYSTEM

CROSS-REFERENCE TO RELATED APPLICATIONS

This patent application claims the benefit and priority of Chinese Patent Application No. 202310136253.0, filed with the China National Intellectual Property Administration on Feb. 20, 2023, the disclosure of which is incorporated by reference herein in its entirety as part of the present application.

TECHNICAL FIELD

The present disclosure relates to the technical field of intelligent driving, in particular to a vehicle driving intelligent assistance system.

BACKGROUND

With the rapid development of the automobile industry, more and more kinds of driving assistance products have been developed, such as cameras, positioners, bump-shielded early warning devices, automatic accident call-for-help devices and alarm devices. The existing manner of using these products is simply to superimpose the functions of a plurality of products. There is no coordination among the functions, which does not improve each function. It is impossible to maximize the use of the functions of each driving assistance product to improve the assistance performance of vehicle driving.

The premise of intelligent driving is that the chosen vehicle meets the dynamic requirements of driving, and the sensor on the vehicle can obtain relevant audio-visual signals and information and control a corresponding servo system through cognitive calculation.

Autonomous driving is under the control of an intelligent system, completing driving behaviors such as lane keeping, overtaking and merging, stopping at a red light and driving at a green light, and interacting with lamp signals and flute signals. Manual intervention means that the driver responds to the actual road conditions under a series of prompts from the intelligent system.

Intelligent driving is an important channel for the combination of industrial revolution and informatization. Rapid development will change the flow mode of people, resource elements and products, and subvert human life. However, the existing intelligent driving safety assistance system has some following shortcomings in practical use.

The existing intelligent driving safety assistance system is not mature enough in technology and has few functions, which simply reminds the driver, but cannot effectively assist the vehicle in running and driving, and cannot ensure the safety of the driver. The existing power assistance system has little interference with the vehicle and mainly relies on warnings and reminders. When the driver makes a wrong operation due to reasons such as mood or state, the wrong operation of the driver cannot be corrected in time, so that the safety is not high.

SUMMARY

The purpose of the present disclosure is to solve the shortcomings in the prior art and provide a vehicle driving intelligent assistance system.

In order to achieve the above purpose, the present disclosure uses the following technical scheme.

A vehicle driving intelligent assistance system is provided, including an electronic control unit and a Controller Area Network (CAN) module, wherein the CAN module is connected with a driving detection module, a vehicle body state detection module, an engine detection module and an environment detection module; the driving detection module is configured to acquire a driving speed and a wheel slip rate of a vehicle, and detect starting, driving and braking conditions of the vehicle, the vehicle body state detection module is configured to acquire a steering angle of a steering wheel and suspension conditions, the engine detection module is configured to acquire engine power data, and the environment detection module is configured to acquire environmental information around the vehicle and road conditions; the electronic control unit is connected with a vehicle body stabilization system, a vehicle control system and a lane departure early warning module; the vehicle body stabilization system is configured to control braking of a driving wheel and an active wheel to improve anti-slip performance of the vehicle, and the vehicle control system is configured to control acceleration, steering or braking of the vehicle to achieve assisted driving.

Preferably, the electronic control unit is connected with the CAN module through a cable, and a lane keeping assistance system, an adaptive cruise control system and a cruise control system are provided in the electronic control unit.

Preferably, the driving detection module includes a wheel speed sensor, a vehicle speed sensor and an Anti-lock Braking System (ABS) sensor, the vehicle body state detection module includes a steering wheel angle sensor and a suspension height sensor, and the engine detection module includes an engine speed sensor and a throttle position sensor.

Preferably, the environment detection module includes an image sensor, a laser radar, a millimeter-wave radar, a biosensor and an illumination sensor.

Preferably, the vehicle body stabilization system includes an Anti-lock Braking System (ABS) and an Acceleration Slip Regulation (ASR), and the vehicle control system includes an engine control system, an electric power steering system, a brake control system, a vehicle speed limiter and a lighting control system.

Preferably, the engine control system includes a throttle stepping motor, a fuel injection valve and an electronic ignition system, and the electric power steering system includes a steering wheel torque sensor, a yaw rate sensor, a steering wheel locking system and a steering power motor.

Preferably, the electronic control unit is connected with a wireless communication module and a map positioning module.

Preferably, working steps of the assistance system include the following steps:
Step 1: when the vehicle is driving on a road, the environment detection module detects the road environment and recommends different assistance modes according to driving road conditions, and the assistance modes include passive power-assisted driving, assistance power-assisted driving and active power-assisted driving;
Step 2: a driver selects a corresponding assistance mode as required, the vehicle runs normally, and the driving detection module, the vehicle body state detection module and the engine detection module detect the driving state of the vehicle;

Step 3: according to different road conditions, the electronic control unit controls the vehicle body stabilization system and the vehicle control system to work, so as to ensure the stable driving of the vehicle;

A. when the vehicle is driving at a high speed, the electronic control unit defines the steering wheel to prevent accidents due to the fact that the steering wheel is out of control and the vehicle deviates from the driving lane at a high speed;

B. when the vehicle is driving on a rainy and snowy road, the electronic control unit controls the brake to prevent the vehicle from slipping due to brake locking;

C. when the vehicle is driving on a dangerous road or a bumpy road, the electronic control unit assists in controlling and limiting the steering wheel and the engine, so as to prevent the vehicle from getting out of control due to the misoperation of the driver.

Compared with the prior art, the present disclosure has the following beneficial effects.

1. According to the present disclosure, the vehicle state and the internal and external environment are detected through a driving detection module, a vehicle body state detection module, an engine detection module and an environment detection module, so as to provide a comprehensive data basis for intelligent driving assistance, ensure the reliability of intelligent driving and improve the safety and stability of vehicle driving.

2. According to the present disclosure, the vehicle body stabilization system and the vehicle control system interfere with the driving state of the vehicle, the driving force, the braking force and the direction of the driving wheel and the driven wheel of the vehicle are actively adjusted, the traction force of the vehicle is changed, and it is ensured that the vehicle drives smoothly on the road.

3. According to the present disclosure, the data acquired by a sensor is analyzed by the electronic control unit, a steering wheel, an engine and a brake are limited in a certain range when driving at a high speed or at a dangerous road section, so as to avoid driving accidents resulted from wrong operation of a driver.

DRAWINGS

FIG. 1 is a schematic working flow diagram of a vehicle driving intelligent assistance system according to the present disclosure.

In the FIGURE: 1. Driving detection module; 2. Vehicle body state detection module; 3. Engine detection module; 4. Environment detection module; 5. Vehicle control system; 6. Vehicle body stability system.

DETAILED DESCRIPTION

The technical scheme in the embodiment of the present disclosure will be clearly and completely described with reference to the attached drawings hereinafter. Obviously, the described embodiments are only some of the embodiments of the present disclosure, rather than all of the embodiments. The following description of at least one exemplary embodiment is merely illustrative in nature and is in no way intended to limit the present disclosure, its application or use. Based on the embodiments in the present disclosure, all other embodiments obtained by those skilled in the art without creative work belong to the scope of protection of the present disclosure.

Referring to FIG. 1, a vehicle driving intelligent assistance system includes an electronic control unit and a Controller Area Network (CAN) module. The electronic control unit is connected with the CAN module through a cable, so as to realize data communication. There are a plurality of groups of electronic control units. The CAN module is configured to realize communication data forwarding among electronic control units and sensors of the whole vehicle, so that the whole vehicle realizes regional network control of an on-board electronic control device. A lane keeping assistance system, an adaptive cruise control system and a cruise control system are provided in the electronic control unit. The CAN module is connected with a driving detection module 1, a vehicle body state detection module 2, an engine detection module 3 and an environment detection module 4.

The driving detection module 1 includes a wheel speed sensor, a vehicle speed sensor and an Anti-lock Braking System (ABS) sensor. The driving detection module 1 is configured to acquire a driving speed and a wheel slip rate of a vehicle, and detect starting, driving and braking conditions of the vehicle, so as to assist the driver to judge whether the vehicle is driving normally on the road.

The vehicle body state detection module 2 is configured to acquire a steering angle of a steering wheel and suspension conditions. The vehicle body state detection module 2 includes a steering wheel angle sensor and a suspension height sensor. A yaw rate sensor, a lateral acceleration sensor and a wheel displacement sensor can be further provided as required, wherein the yaw rate sensor is configured to record all movements of the vehicle rotating around the vertical axis; the lateral acceleration sensor is configured to detect the magnitude of the centrifugal force during steering; and the wheel displacement sensor is configured to measure the change of the relative position of the wheel and the vehicle body, and ensure that the electronic control unit comprehensively acquires the vehicle body state data.

The engine detection module 3 is configured to acquire engine power data. The engine detection module 3 includes an engine speed sensor and a throttle position sensor. The driver steps on the accelerator pedal to change the throttle opening. The throttle position sensor detects the throttle opening to judge whether the driver has an acceleration intention.

The environment detection module 4 is configured to acquire environmental information around the vehicle and road conditions. The environment detection module 4 includes an image sensor, a laser radar, a millimeter-wave radar, a biosensor and an illumination sensor. The image sensor shoots the surrounding environment of the vehicle body or road signs through a camera, which is convenient for the electronic control unit to analyze and formulate a driving path. The combination of the laser radar and the millimeter-wave radar is used to perceive the road environment, which is convenient for the electronic control unit to plan the driving path and control the vehicle to achieve the predetermined goal. For example, the relative distance between the target and itself can be calculated according to the turn-back time of the laser of the laser radar after encountering an obstacle, which can help the vehicle identify the intersection and the direction. The biosensor is configured to detect the state of the driver, and judge whether there is drunk driving or fatigue driving. The illumination sensor is configured to detect the external illumination as the data basis for lighting control. At night or when entering the tunnel, a low beam is automatically turned on, and a high beam is turned on in road sections with poor lighting. In case of encountering a passing vehicle, a low beam is automatically switched to improve driving safety. Infrared sensors can be added to detect pedestrians and animals as required, so that the electronic control unit can remind drivers to make way and slow down in advance to ensure pedestrian safety.

The electronic control unit is connected with a vehicle body stabilization system 6, a vehicle control system 5, a lane departure early warning module and a fatigue driving early warning module.

The vehicle body stabilization system 6 is configured to control braking of a driving wheel and an active wheel to improve anti-slip performance of the vehicle. The vehicle body stabilization system 6 includes an Anti-lock Braking System (ABS) and an Acceleration Slip Regulation (ASR). If the wheel slips or spins, the electronic control unit acquires and analyzes the signals of the wheel speed sensor, the vehicle speed sensor and the ABS sensor, and adjusts the driving wheel or the driven wheel accordingly. The engine power is reduced by reducing the throttle opening or the wheel slip is controlled by the brake to control the traction of the vehicle, so as to avoid the wheel slip when the friction between the tire and the ground is insufficient in rainy and snowy weather, or avoid tire wear due to the fact the wheel is locked and slips on the ground when braking.

For example, when it is necessary to turn left, an when the vehicle understeers, the electronic control unit judges the understeer of the vehicle body according to the signals acquired by the sensor, controls the braking of the left rear wheel, and generates a pulling force and a torsion force to counter the understeer trend of the head of the vehicle pushing to the right.

When the rear wheels have insufficient grip or the accelerator of a rear-wheel drive vehicle is stepped too hard and oversteer occurs, resulting a tail-drift, the vehicle body stabilization system 6 controls the braking of the right front wheel, reduce the output power of the engine and correct the wrong steering posture.

When braking in a straight line, the adhesion on the ground is uneven. When the vehicle deviates, the driving detection module 1 detects the wheel slip rate to determine the adhesion between each wheel and the ground. The vehicle body stability system 6 controls some wheels to increase or decrease the braking force, and the traction of the vehicle is adjusted, so that the vehicle drives smoothly and advances according to the driving path expected by the driver.

The vehicle control system 5 is configured to control acceleration, steering or braking of the vehicle to achieve assisted driving. The vehicle control system 5 includes an engine control system, an electric power steering system, a brake control system, a vehicle speed limiter and a lighting control system. The vehicle is controlled by the driver, but the vision of the driver is limited. When there is an emergency or the consciousness of the driver is unclear, there may be misoperation, which may even result in traffic accidents in serious cases. The vehicle control system 5 can assist driving and improve driving safety. The electronic control unit receives sensor signals, analyzes the signals according to the environment and road conditions, and then gives instructions. The vehicle control system 5 controls the vehicle to slow down, turn or brake, and limits the speed through the vehicle speed limiter in special road sections to avoid the increase of driving hazards due to overspeed during driving of the vehicle. At night or in road sections with poor lighting, the lighting control system can automatically turn on the lights to improve driving safety and realize driving assistance.

The engine control system includes a throttle stepping motor, a fuel injection valve and an electronic ignition system, so as to accurately control the engine power.

The electric power steering system includes a steering wheel torque sensor, a yaw rate sensor, a steering wheel locking system and a steering power motor. The electric power steering system is configured to assist the driver in steering, detect the steering force that the driver controls the steering wheel at the same time, and judge the steering intention of the driver. If the steering trend analyzed by the electronic control unit is inconsistent with the steering intention of the driver, the electronic control unit analyzes the current situation when there are differences. If the vehicle is in a high-speed driving state, the steering wheel can be locked by the steering wheel locking system, and the steering wheel can only be adjusted in a small range to prevent the vehicle from getting out of control due to large-scale steering. When the vehicle speed is not high, the steering wheel torque sensor detects the torque received by the steering wheel. When the torque received by the steering wheel exceeds the preset threshold, the electric power steering system follows the intention of the driver to adjust the steering direction, and the electronic control unit records the data. In addition, when the biosensor detects the drunk driving or fatigue driving of the driver, the electric power steering system performs steering control according to the road conditions acquired by the electronic control unit, keeps driving in a straight line or slows down to make way, and turns on a danger warning light through the lighting control system, so as to slowly reduce the speed and pull over to avoid accidents due to the fact that the driver unconsciously controls the steering wheel and steers accidentally.

Both the steering wheel torque sensor and the yaw rate sensor are electrically connected with the electronic control unit, and are configured to detect the torque on the steering wheel and the angular velocity that the longitudinal axis of the vehicle swings, and transmit the data to the electronic control unit. When the electric power steering system controls the vehicle to deviate from the lane or the driver controls the steering wheel and deviates from the lane for a long time, the lane departure warning module gives a prompt to remind the driver to pay attention and make timely adjustment.

In addition, a camera can be added to shoot the driver, and the state of the driver can be detected by vision. The biosensor and the camera detect the state of the driver. If there is fatigue driving, the fatigue driving early warning module will give an emergency voice reminder to prevent the driver from making a wrong driving action and interfering with the correct driving of the vehicle when the driver is asleep or confused.

The electronic control unit is connected with a wireless communication module and a map positioning module. The wireless communication module facilitates forming a network between vehicles, exchanging data, and sharing the data of a preceding vehicle to a following vehicle, so as to avoid a serial collision due to the fact that the following vehicle brakes untimely when the preceding vehicle brakes suddenly or crashes. The map positioning module is configured to position the vehicles, which is convenient for the electronic control unit to make a driving path.

Working Steps:
  Step 1: when the vehicle is driving on a road, the environment detection module 4 detects the road environment. The image sensor, the laser radar and the millimeter-wave radar detect the road conditions, acquire information such as road width, road surface quality and road traffic volume, and recommend different assistance modes according to driving road conditions. The assistance modes include passive power-assisted driving, assistance power-assisted driving and active power-assisted driving. For the passive power-assisted driving, the electronic control unit only receives sensor signals without giving instructions, the vehicle is completely controlled by the driver, and the power-assisted steering and the power-assisted braking are passively performed. For the assistance power-assisted driving, the electronic control unit processes and analyzes the sensor signals to prompt the driver to adjust the direction or speed. After the driver makes an operation, the vehicle control system 5 sends an instruction to control the vehicle to turn or brake. For the active power-assisted driving, the electronic control unit processes and analyzes the sensor signals. If the driving speed is high, the lane is narrow or the driver is driving for a long time, when the driver is tired, the vehicle control system 5 locks the steering wheel and actively limits the speed, thus improving the driving safety and avoiding an accident due to the fact that the driver unintentionally turns the steering wheel.

In urban roads, and in intersections with lots of pedestrians, the passive power-assisted driving or the assistance power-assisted driving can be used to limit the speed and slow down, so as to ensure that the driver has enough time to react and complete braking or steering. When driving on highways or elevated roads, the active power-assisted driving can be used, and the electronic control unit can keep the speed of the vehicle stable, and assist in stabilizing the steering wheel, so as to avoid large-scale steering and accidents due to the unconscious action or an accidental touch of the driver.

Step 2: the driver selects a corresponding assistance mode or turns off the assistance function as required, the vehicle runs normally, and the driving detection module 1, the vehicle body state detection module 2 and the engine detection module 3 detect the driving state of the vehicle, and acquire data such as the speed, the wheel slip rate, the starting braking, the steering and the engine power when the vehicle runs on the road, so that the electronic control unit can accurately grasp the driving state of the vehicle.

Step 3: according to different road conditions, the electronic control unit controls the vehicle body stabilization system 6 and the vehicle control system 5 to work, so as to ensure the stable driving of the vehicle.

A. when the vehicle is driving at a high speed, the electronic control unit defines the steering wheel through the steering wheel locking system and the steering power motor, so as to prevent accidents due to the fact that the steering wheel is out of control and the vehicle deviates from the driving lane at a high speed.

When driving at a simulated high speed of 120 km/h, the steering wheel turns 45 degrees, and the front wheel turns 3 degrees accordingly. Under normal circumstances, it takes 0.75 s for the driver to realize the danger and take corresponding measures. If this operation is maintained, the driver will often have an accident before he realizes the danger. Therefore, the steering wheel angle sensor detects the amplitude that the driver rotates the steering wheel and limits the amplitude to avoid accidents resulted from the excessive rotating amplitude.

B. when the vehicle is driving on a rainy and snowy road, the electronic control unit controls the brake through the Anti-Lock Braking System (ABS) to prevent the vehicle from slipping due to brake locking. The electronic control unit controls the throttle stepping motor and the brake through the Acceleration Slip Regulation (ASR), so as to control the driving force and the braking force of the driving wheel and the driven wheel and change the traction force of the vehicle body, thereby improving the driving handling stability of the vehicle and avoiding sliding or even sideslip when starting or accelerating.

C. when the vehicle is driving on a dangerous road or a bumpy road, such as a narrow road and a narrow bridge, and when both sides of the narrow road and the narrow bridge are sunken or even suspended, the wheel is equivalent to the width of the road. A large wheel deflection angle will easily cause the wheel to fall, which will damage the chassis of the vehicle and even make the vehicle unable to drive. Therefore, the electronic control unit is needed to assist the driver to drive and improve the driving safety. The electronic control unit locks and fine-tunes the steering wheel through the steering wheel locking system and the steering power motor, which improves the wheel steering accuracy, and at the same time limits the engine power through the throttle stepping motor, the fuel injection valve and the electronic ignition system, so as to prevent the vehicle from getting out of control due to the misoperation of the driver.

The above is only the preferred embodiment of the present disclosure, but the scope of protection of the present disclosure is not limited thereto. Any equivalent substitution or change made by those skilled in the art according to the technical scheme and inventive concept of the present disclosure within the technical scope disclosed by the present disclosure should be included in the scope of protection of the present disclosure.

What is claimed is:
1. A vehicle driving intelligent assistance system, comprising:
  an electronic control unit and
  a Controller Area Network (CAN) module,
  wherein the CAN module is connected with a driving detection module (1), a vehicle body state detection module (2), an engine detection module (3) and an environment detection module (4);
  the driving detection module (1) is configured to acquire a driving speed and a wheel slip rate of a vehicle, and detect starting, driving and braking conditions of the vehicle, the vehicle body state detection module (2) is configured to acquire a steering angle of a steering wheel and suspension conditions, the engine detection module (3) is configured to acquire engine power data, and the environment detection module (4) is configured to acquire environmental information around the vehicle and road conditions;
  the electronic control unit is connected with a vehicle body stabilization system (6), a vehicle control system (5) and a lane departure early warning module;
  the vehicle body stabilization system (6) is configured to control braking of a driving wheel and an active wheel to improve anti-slip performance of the vehicle, and the vehicle control system (5) is configured to control acceleration, steering or braking of the vehicle to achieve assisted driving;

wherein working steps of the assistance system comprise the following steps:

when the vehicle is driving on a road, the environment detection module (4) detects a road environment and recommends different assistance modes according to driving road conditions, and the assistance modes comprise passive power-assisted driving, assistance power-assisted driving and active power-assisted driving;

a driver selects a corresponding assistance mode as required, and when the vehicle runs normally, the driving detection module (1), the vehicle body state detection module (2) and the engine detection module (3) detect the driving state of the vehicle;

according to different road conditions, the electronic control unit controls the vehicle body stabilization system (6) and the vehicle control system (5) to work, so as to ensure the stable driving of the vehicle;

when the vehicle is driving at a high speed, the electronic control unit defines the steering wheel to prevent accidents due to the fact that the steering wheel is out of control and the vehicle deviates from the driving lane at the high speed;

when the vehicle is driving on a rainy and snowy road, the electronic control unit controls the brake to prevent the vehicle from slipping due to brake locking;

when the vehicle is driving on a dangerous road or a bumpy road, the electronic control unit assists in controlling and limiting the steering wheel and the engine, so as to prevent the vehicle from getting out of control due to the misoperation of the driver.

2. The vehicle driving intelligent assistance system according to claim 1, wherein the electronic control unit is connected with the CAN module through a cable, and a lane keeping assistance system, an adaptive cruise control system and a cruise control system are provided in the electronic control unit.

3. The vehicle driving intelligent assistance system according to claim 1, wherein the driving detection module (1) comprises a wheel speed sensor, a vehicle speed sensor and an Anti-lock Braking System (ABS) sensor, the vehicle body state detection module (2) comprises a steering wheel angle sensor and a suspension height sensor, and the engine detection module (3) comprises an engine speed sensor and a throttle position sensor.

4. The vehicle driving intelligent assistance system according to claim 3, wherein the environment detection module (4) comprises an image sensor, a laser radar, a millimeter-wave radar, a biosensor and an illumination sensor.

5. The vehicle driving intelligent assistance system according to claim 1, wherein the vehicle body stabilization system (6) comprises an Anti-lock Braking System (ABS) and an Acceleration Slip Regulation (ASR), and the vehicle control system (5) comprises an engine control system, an electric power steering system, a brake control system, a vehicle speed limiter and a lighting control system.

6. The vehicle driving intelligent assistance system according to claim 5, wherein the engine control system comprises a throttle stepping motor, a fuel injection valve and an electronic ignition system, and the electric power steering system comprises a steering wheel torque sensor, a yaw rate sensor, a steering wheel locking system and a steering power motor.

7. The vehicle driving intelligent assistance system according to claim 1, wherein the electronic control unit is connected with a wireless communication module and a map positioning module.

* * * * *